(No Model.)
C. KELLNER.
APPARATUS FOR MAKING BLEACHING POWDER.
No. 530,996. Patented Dec. 18, 1894.
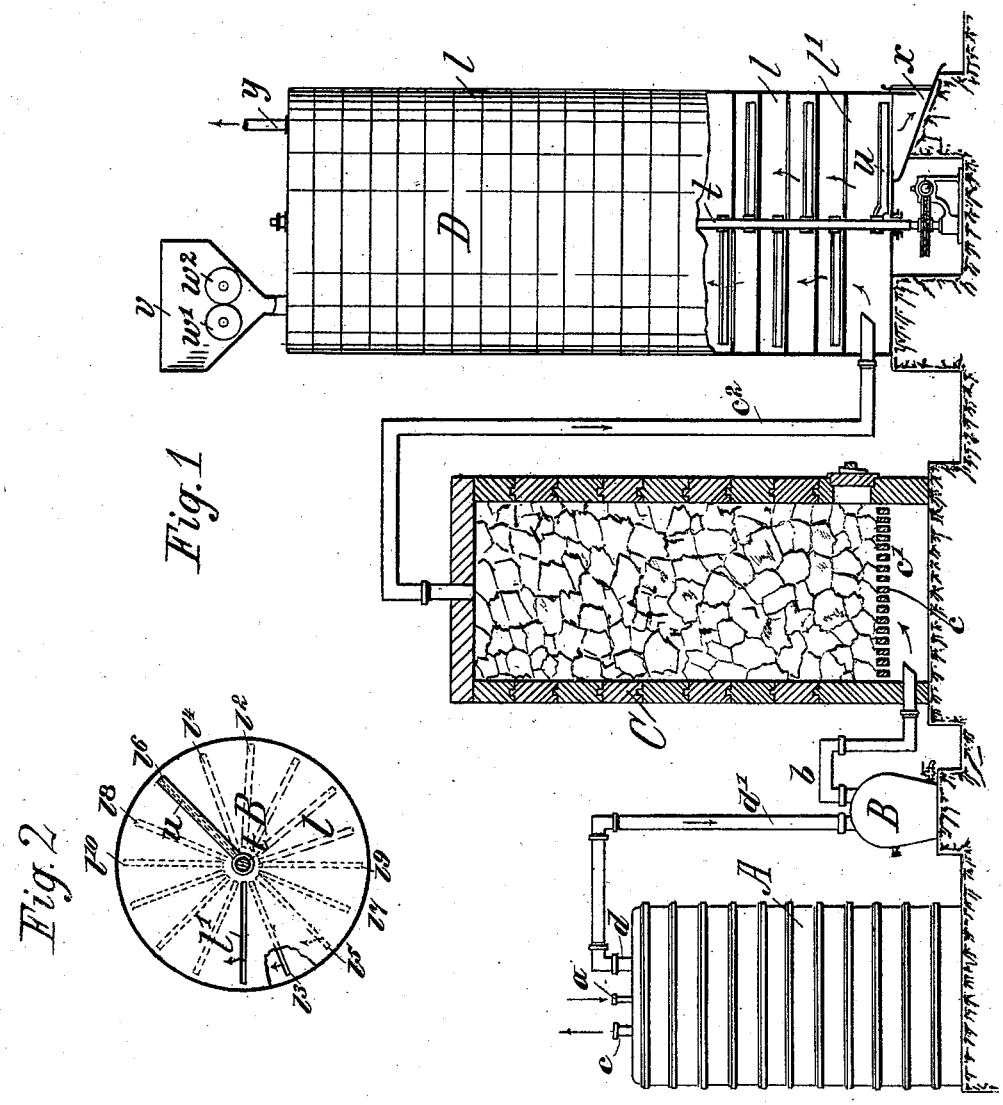
Witnesses:
H. G. Dieterich
B. W. Sommers
Inventor:
Carl Kellner
by [signature]
Atty.

UNITED STATES PATENT OFFICE.

CARL KELLNER, OF VIENNA, AUSTRIA-HUNGARY.

APPARATUS FOR MAKING BLEACHING-POWDER.

SPECIFICATION forming part of Letters Patent No. 530,996, dated December 18, 1894.

Application filed January 4, 1892. Serial No. 417,014. (No model.)

*To all whom it may concern:*

Be it known that I, CARL KELLNER, a subject of the Emperor of Austria-Hungary, residing at Vienna, in the Province of Lower Austria, in the Empire of Austria-Hungary, have invented certain new and useful Improvements in the Manufacture of Chloride of Lime; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to the production of bleaching powder commonly known as chlorid of lime, obtained by the saturation of calcium hydrate with chlorin, and it has for its object the provision of means whereby the operation may not only be carried on more rapidly but also more effectually and more economically.

My invention consists in the construction of the absorption tower and in the combination therewith of a chlorin generator, a wash vessel and a purifier, as will now be fully described, reference being had to the accompanying drawings, in which—

Figure 1 is a more or less schematic elevation partly in section of an apparatus embodying my invention. Fig. 2 is a transverse section of the absorption tower taken through one of the chambers thereof.

My improved apparatus employed in the production of bleaching powder consists of a chlorin generator, A, a wash vessel, B, a purifier, C, and an absorption tower, D. Any well-known chlorin generator may be used, and the chlorin may be obtained from any appropriate material, as for instance, from the binoxid of manganese and hydrochloric acid.

In an application for patent of even date with this, Serial No. 417,012, I have described a mode of and an apparatus for obtaining chlorid by the electrolytic treatment of hydrochloric acid in a continuous and economic manner, and for these reasons I prefer to employ a generator of the construction therein described and shown, the chlorin exhaust branch, $d$, being connected by pipe, $d'$, with the wash vessel, B, which is or may be of any well-known or suitable construction, as for instance the ordinary water bottle, wherein the chlorin is freed from most of the hydrochloric acid carried over.

The hydrogen exhaust branch, $c$, of the electrolyzer, A, is connected with a suitable gas holder or with a carburetor, so that said gas may be utilized either as a heating or an illuminating agent, the hydrochloric acid being supplied to the electrolyzer through branch, $a$.

The wash vessel, B, is connected by pipe, $b$, with a chamber, $c'$, formed below a perforated false bottom, $c$, or a grating in the lower part of the purifier, C, which is filled with binoxid of manganese so as to free the chlorin from the last traces of hydrochloric acid that may be carried over from the wash vessel, B. The upper end of the purifier is connected by pipe, $c^2$, with the lowermost chamber of the absorption tower, D, which latter is divided by horizontal partitions into shallow absorption chambers, $l$; and in each of said partitions is formed a narrow slot, $l'$, the relative position of the slots in said partitions being such that the slots in the partitions of two adjacent or contiguous chambers will not register with each other, as shown in full and dotted lines in Fig. 2.

The absorption tower is preferably cylindrical in cross-section, a shaft, $t$, extending centrally therethrough and carrying drags or scrapers, $u$, preferably only one for each chamber, said scrapers carrying the material around over the slots in the partitions and causing it to fall therethrough from chamber to chamber, and stirring or turning the same over at the same time so as bring the chlorin into more intimate contact with the particles of calcium hydrate. Inasmuch as the slots in the partitions do not register with each other the chlorin traverses a zigzag course—that is to say, the chlorin passes completely across each chamber before it can pass up into the next chamber above. For instance, let it be supposed that $l'$, Fig. 2 indicatis the slot in the uppermost partition, $l$, then, $l^2$, would be the slot in the partition next below, $l^3$, the slot in the next succeeding partition, and $l^4$, $l^5$, $l^6$, $l^7$, &c., those in the successive partitions below so that the chlorin coming into the lowermost chamber will circulate through each chamber in succession until it reaches the outlet, $y$.

The calcium hydrate is preferably supplied in the pulverulent form to the upper chamber of the absorption tower, and the supply thereof is controlled by means of feed rolls, and from said uppermost chamber it gradually passes down from chamber to chamber by falling through the slots in the partitions, being carried completely around the chamber by the scrapers or drags, $u$, and is at the same time turned or stirred. In this manner the hydrate is exposed for a longer time to the chlorin before it reaches the lowermost chamber than would be the case if it were simply allowed to drop from the top to the bottom of the tower. On the other hand, the hydrate being continually kept in motion and turned over and over, is brought into more intimate contact with the chlorin, whereby the absorption is greatly promoted. If the absorption tower is of sufficient height all of the chlorin that may be supplied thereto will be absorbed by the lime. It is, however, not always practicable to erect towers of the required height to produce the bleaching agent on a large scale. To this end a number of such towers, the combined heights of which would be equal to the required height of a single tower, may be connected in series, the first of the series being connected with the purifier, C, the exhaust pipe, $y$, at the top of each tower being connected with the lowermost chamber of the tower next succeeding. The bleaching powder is removed from the lower chamber of the absorption tower at, $x$, the discharge opening being provided with a suitable gate.

It will be observed that by means of the described apparatus the production of bleaching powder is a continuous or uninterrupted one, and that the quantity of the bleaching powder produced will simply depend upon the dimensions or capacity of the constituent elements of the apparatus or plant.

Having thus described my invention, what I claim as new therein, and desire to secure by Letters Patent, is—

The herein described apparatus for the production of bleaching powder, comprising an absorption tower divided into a series of chambers communicating with one another by a long narrow opening or slot formed in the intervening partitions, the slots in the partitions of contiguous chambers being arranged so as not to register with one another, a revoluble scraper for each of the chambers, feeding devices for feeding the hydrate of lime to the upper chamber in the tower in predetermined uniform quantity, and a source of chlorin supply connected with the lower chamber, for the purpose set forth.

In testimony whereof I affix my signature in presence of two witnesses.

CARL KELLNER.

Witnesses:
JULIUS GOLDSCHMIDT,
A. SCHLESSING.